United States Patent
Smith

[11] 3,888,584
[45] June 10, 1975

[54] SEMI-AUTOMATIC DOCUMENT HANDLER
[75] Inventor: Craig A. Smith, Pittsford, N.Y.
[73] Assignee: Xerox Corporation, Stamford, Conn.
[22] Filed: Mar. 8, 1974
[21] Appl. No.: 449,402

[52] U.S. Cl. .................................. 355/75; 355/72
[51] Int. Cl. ........................................... G03l 27/62
[58] Field of Search .......... 355/64, 75, 47, 118, 49, 355/50, 51, 25, 82, 72; 271/273, 4

[56] References Cited
UNITED STATES PATENTS
| | | | |
|---|---|---|---|
| 3,295,430 | 1/1967 | Limberger | 355/82 |
| 3,642,376 | 2/1972 | Halvorsen et al. | 355/82 X |
| 3,726,589 | 4/1973 | Difulvio | 355/64 |

*Primary Examiner*—Samuel S. Matthews
*Assistant Examiner*—E. M. O'Connor

[57] ABSTRACT

Improved document handling for a xerographic copier is disclosed with a document input tray closely adjacent one edge of the copying platen. Book copying on the same platen edge is provided by pivotally mounting the document input tray to lift vertically rearwardly away from the platen along a hinge line at the rear of the input tray. A fixed document output tray below the input tray provides a supporting surface downwardly sloping away from the platen for supporting the unsupported portion of a book being copied on said platen.

3 Claims, 9 Drawing Figures

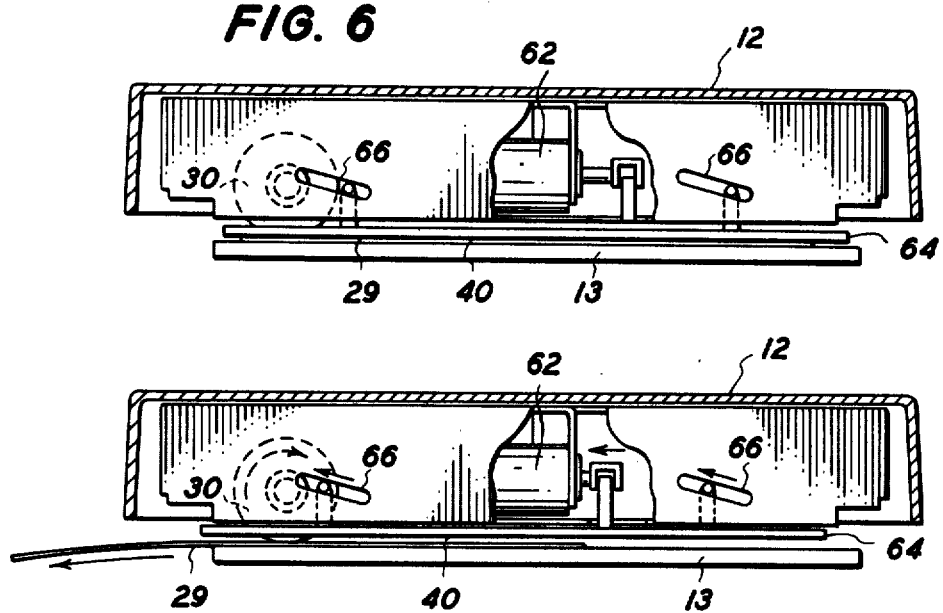
FIG. 6
FIG. 7
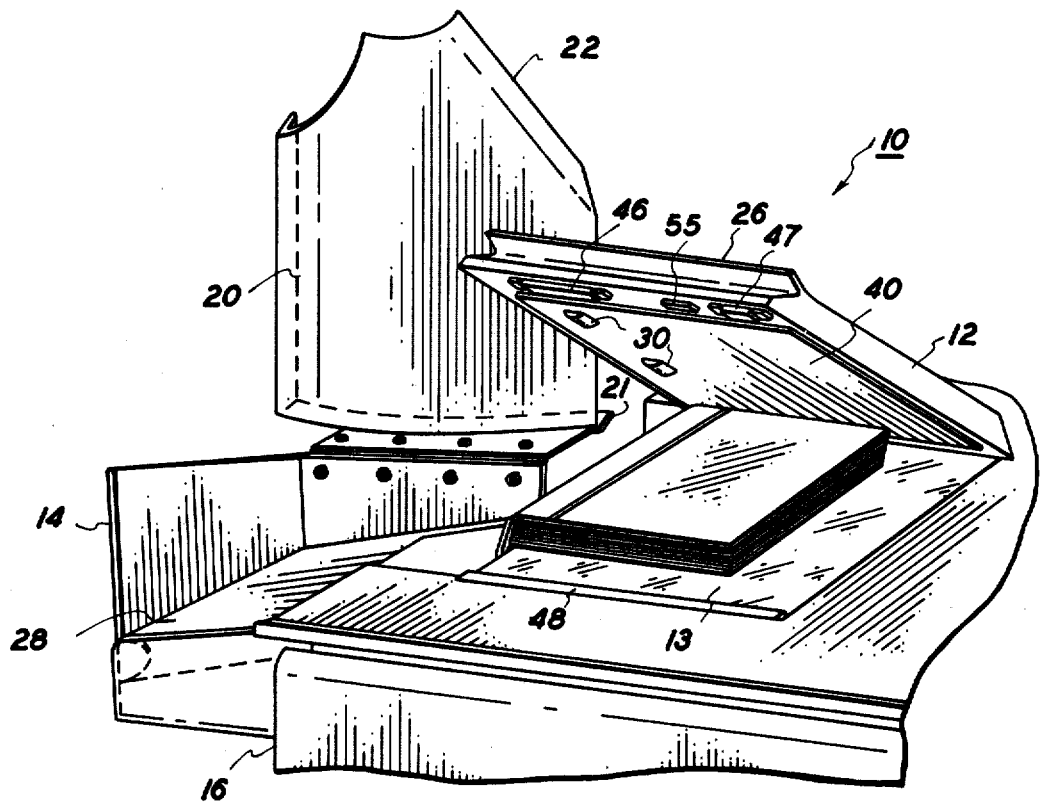
FIG. 1

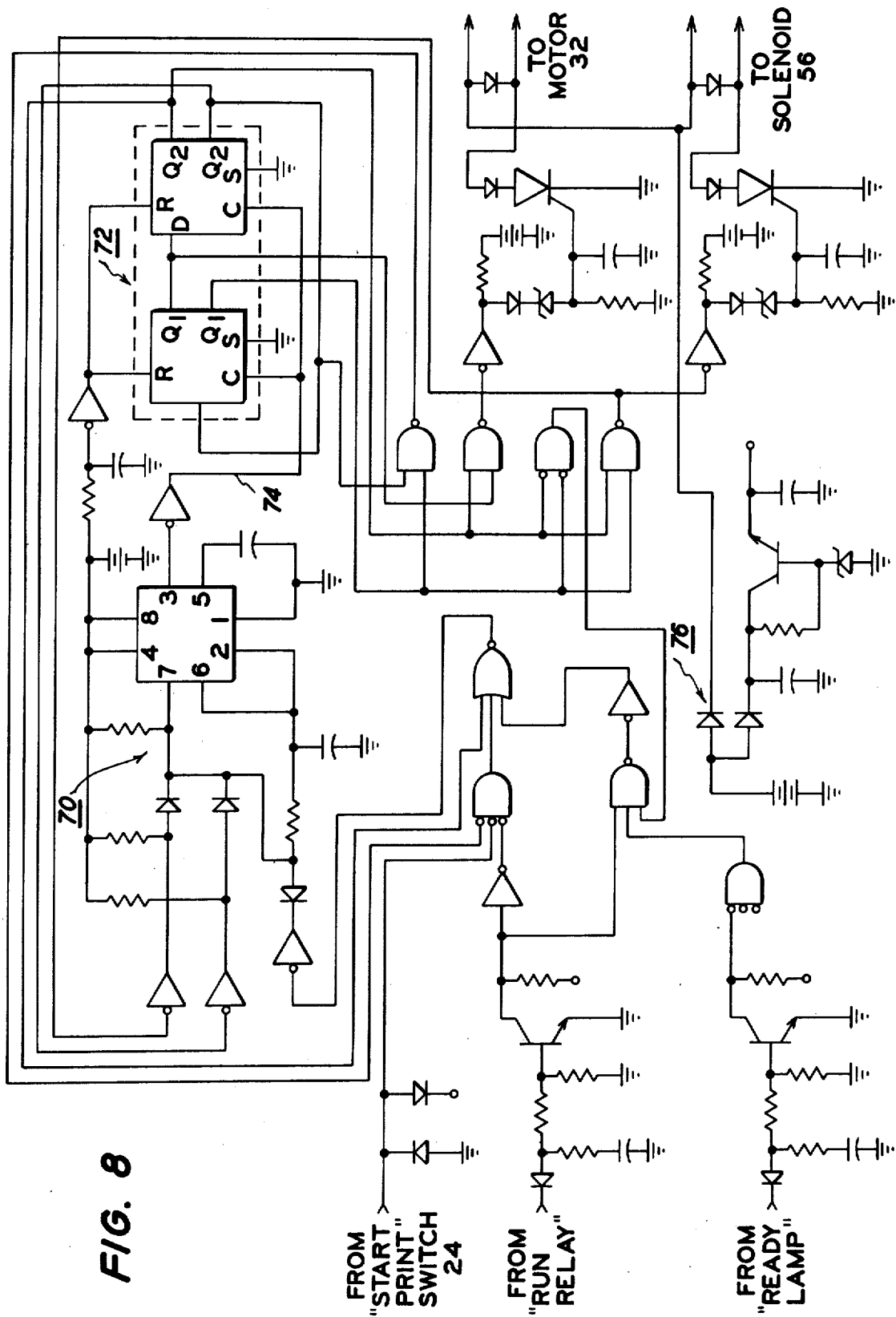

SEMI-AUTOMATIC DOCUMENT HANDLER

The present invention relates to document copying apparatus, and more particularly to improved document handling apparatus for both individual document and corner book copying from a copying station in such copying apparatus.

Document copying, particularly for the faster xerographic copiers now in commercial use, such as the Xerox "4000" copier, presents challenges in the faster handling of the documents being copied in order to utilize the faster copying capability of the copier. Original documents may vary widely in size, weight, condition, value, age, and thickness, and may have curls, tears, wrinkles, staples, etc. This presents obvious difficulties in providing for faster and more automatic document handling without damage with an inexpensive device. The presently disclosed apparatus provides for improved fully manual placement of the document on a transparent copying platen or window for document safety, and allows conventional manual placement of a platen cover down over the document for conventional stationary document copying, and provides for faster document handling by the cooperating combination of several different individually previously known sheet handling and platen cover handling techniques. Both real and operator perceived document safety is provided by manual operator accessibility of the document at any given time.

The document handling art in copiers is well-developed and includes commercial products by Xerox Corporation, IBM and others which provide for automatically feeding documents onto a xerographic copying platen and/or removing them after copying. Exemplary of numerous relevant patents noted as teaching certain features of the present specification, as will be apparent from their disclosures, are the following U.S. patents, which are hereby made of record as a part of this specification as examples without any representation as to completeness: U.S. Pat. Nos. 3,062,110, issued Nov. 6, 1962, to D. W. Shepardson et al, Class 95-1.7; 3,642,371, issued Feb. 15, 1972, to H. L. Jones et al, Class 355/128; 3,615,134, issued Oct. 26, 1971, to D. R. Newcomb, Class 355-75; 3,589,713, issued June 29, 1971, to J. L. Schulze, Class 271/41; 3,341,194, issued Sept. 12, 1967, to L. Bentzman, Class 271/45; 3,288,047, issued Nov. 29, 1966, to W. Limberger, Class 95-75; 1,440,622, issued Jan. 2, 1923, to C. H. Owen; 3,567,214, issued Mar. 2, 1971, to M. G. Crandell et al, Class 271-10; and 3,768,803, issued Oct. 30, 1973, to K. Stange, Class 271/34. Pending U.S. application Ser. No. 367,996, filed June 7, 1973, by Werner Hoppner (D/72212C) is cited for its teaching of spacing of a platen cover above a document exposure area of a platen, although as part of a moving document copying feature.

Further objects, features, and advantages of the present invention pertain to the particular apparatus, steps, and details whereby the above-mentioned aspects of the invention are attained. Accordingly, the invention will be better understood by reference to the following description and to the drawings forming a part thereof wherein:

FIG. 1 is a perspective view of an exemplary embodiment of the present invention, as part of an otherwise conventional xerographic copying apparatus;

FIG. 6 is a cross-sectional view illustrating an alternative embodiment of the platen cover illustrated in FIGS. 1-5;

FIG. 7 is the same view as FIG. 6, illustrating the movement of components in the operation of the embodiment;

FIG. 8 is an exemplary schematic logic and timing circuit for the embodiments of FIGS. 1-7; and FIG. 9 is a top view of the upper document tray.

Figure 2:
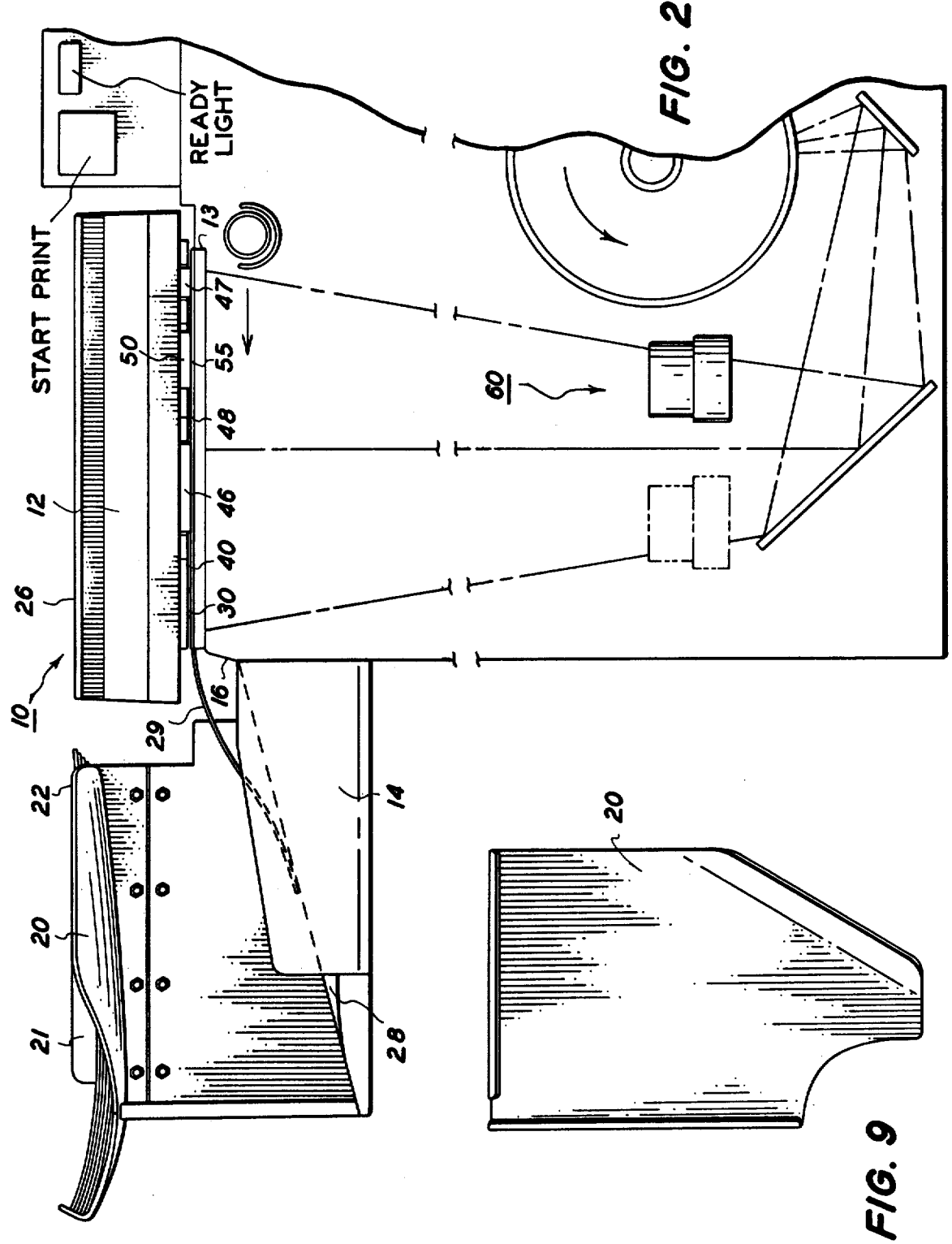
FIG. 2 is a frontal view of the embodiment of FIG. 1, further schematically illustrating the xerographic copying apparatus associated therewith.

Referring now to the drawings, and first to FIGS. 1 and 2, there is shown therein an exemplary copying apparatus 10 with an exemplary document handling system in accordance with the present invention. The disclosed document handling structure comprises a relatively simple and inexpensive modification of the copier 10, which is an existing Xerox "4000" copier. However, it will be appreciated that the invention is applicable to many other copiers.

The disclosed structural modification of the present commercial 4000 copier comprises the replacement of the present passive platen cover with a new platen cover 12 containing a number of important features to be described herein; and the addition of a two-tier document tray assembly at the platen intersecting side 16 of the machine; and the electrical interconnection of the new platen cover components, including logic circuitry, with the existing logic of the copying apparatus 10.

All of the features to be described herein are in addition to, and in parallel with, all of the previous copying apparatus 10 features. Thus, this machine 10 may perform all of its previous functions and also selectively utilize the features added by the structure disclosed herein. The disclosed modifications of the copying apparatus 10 increases the overall effective operator copying speed of the machine, particularly in those copying situations in which only a few copies are being made from each individual document. This copying speed increase is accomplished by assisting the operator with several automated functions.

Considering in detail the disclosed additional structures and functions, there is an added document holding tray assembly 14 mounted directly adjacent the platen 13, at the side 16. The tray assembly 14 consists of an upper document tray 20 overlying and spaced above a lower document tray 28. The upper tray 20 is substantially parallel the platen 13 and is particularly adapted to hold a stack of original documents therein for easy manual transferral of each document from this tray 20 onto the platen 13 for manual registration and copying thereon.

The tray 20 has an upwardly extending inner-edge portion 22 facing the platen 13, underlying that portion of the document stack therein awaiting placement on the platen 13 for copying. Thus, the upper tray 20 has an overall concave surface which causes flexural separation of individual sheets in the stack, as is known in other sheet handling applications, per se. This, and the upward slope of the inner edge of the documents makes it easier and faster for the operator, with one hand, to grasp the upwardly projecting edge of the upper document of the stack of documents and move this individual document a short distance horizontally over onto the platen 13 for copying. Meanwhile, the operator's second hand can be on the platen cover 12, pulling it downwardly to close the platen cover 12 over the document on the platen. Simultaneously, the same second hand can operate a "start print" button 24 on the platen cover. This is the only operator motion and involvement required in the copying process. All other functions are performed automatically.

The platen cover 12 here has a conventional elongated cover closing manual handle 26 at the outer edge thereof. There is a start print switch 24 on the platen cover, which has a large elongated manually operable button closely adjacent and parallel to the handle 26 for a convenient mutual one hand operation of closing the platen cover and actuating the switch 24. Operation of this start print switch 24 initiates the conventional copying of the document on the platen in the same manner as the conventional start print button on the console (control panel) of the copying apparatus 10 itself. However, the start print switch 24 further additionally initiates document ejecting upon the completion of document copying. As soon as the selected number of copies has been made from the document, it is automatically and rapidly ejected from the platen into the lower tray 28, which is positioned to catch each document as it is ejected from the platen. The inner edge portion 22 of the upper tray 20 is adapted and positioned to downwardly deflect any documents ejected theretoward from the platen down into the lower tray 28.

The upper tray 20 here is pivotally hinged along its rear edge to the rest of the tray assembly 14 to pivot rearwardly away from the side 16 of the copying apparatus 10. This provides unobstructed corner book copying on the platen 13 as illustrated in FIG. 1 in contrast to FIG. 2. Since the lower tray 28 is spaced substantially below the platen 13, it offers no obstruction to corner book copying and in fact its downwardly sloping surface partially supports the otherwise free-hanging portion of the book.

To further assist separation of documents in the stack, the upstanding rear edge or stop 21 of the upper tray 20 may be inwardly slanted from the vertical to fan out the sheets in the forward direction. The side guide opposite the platen can also be slanted inwardly. A retard pad may also be provided in the tray on the edge portion 22.

Figure 3:
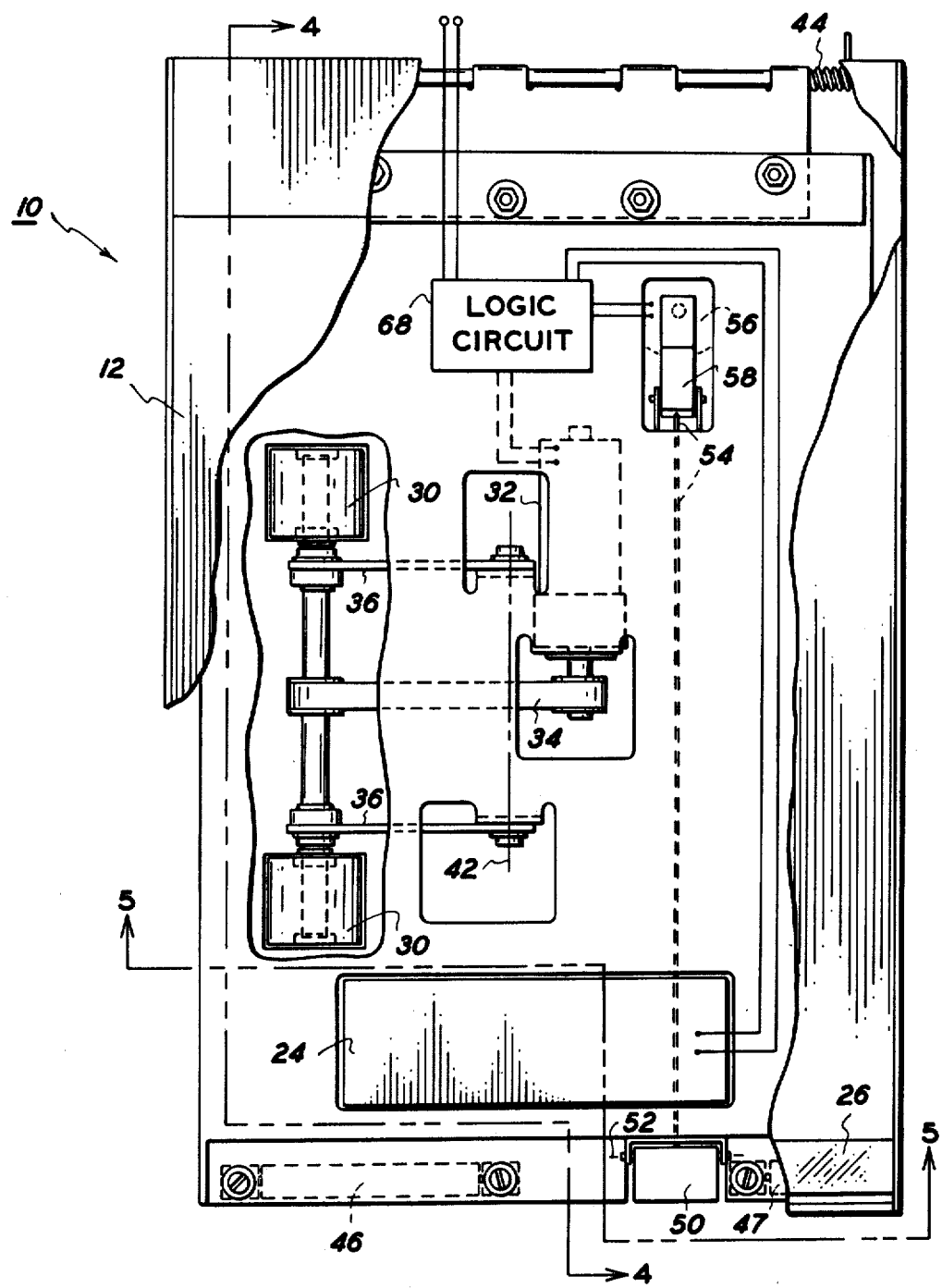
FIG. 3 is a top view of the platen cover of the embodiment of FIGS. 1 – 2, partially broken away to illustrate internal components.
Figure 5:
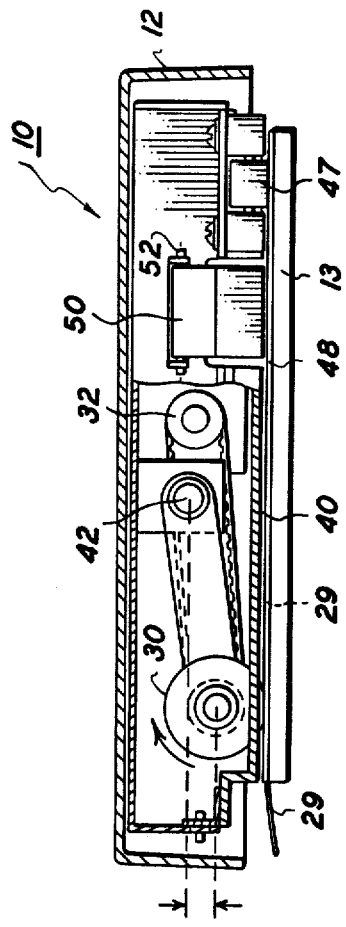
FIG. 5 is a cross-sectional view taken along the line 5—5 of FIG. 3.
Figure 4:
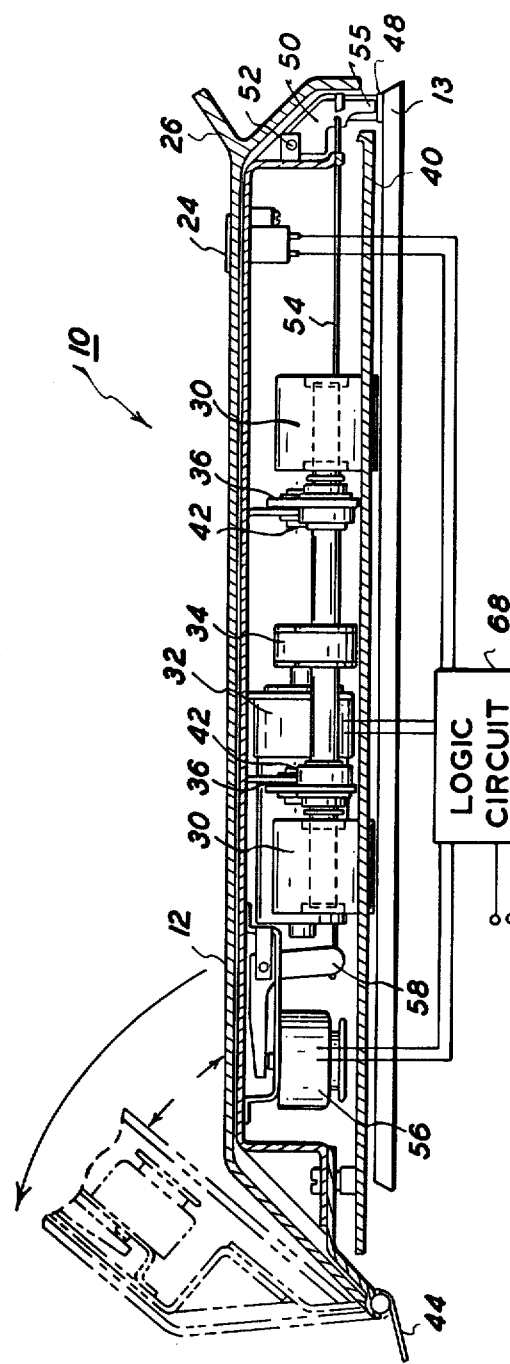
FIG. 4 is a cross-sectional view taken along the line 4—4 of FIG. 3.

As particularly shown in FIGS. 3–5, the disclosed means for ejecting the documents automatically from the platen 13 into the lower tray 28 after the selected number of copies has been made comprises a commonly driven pair of sheet drive wheels 30 inside the platen cover 12. The drive wheels 30 are driven by a conventional small electric motor 32 through a drive belt 34. The common axle of the drive wheels 30 is pivotably mounted to the platen cover 12 by a spaced pair of lever arms 36. The bottom surfaces of the drive wheels 30 retractably extend through the lower surface 40 of the platen cover to lightly engage and overlie only two small areas of the platen 13. Both wheels 30 are positioned adjacent the same side 16 of the platen as the tray assembly 16. The wheels 30 are spaced sufficiently apart and positioned to engage almost any length document on the platen. Their common drive axle prevents skewed feeding. FIG. 2 illustrates a document 29 being ejected.

As may be seen, particularly from FIG. 5, the drive wheels 30 are pivotally mounted about an overlying axis 42, where the upper ends of the lever arms 36 are pivotally attached. This provides a self-energizing (self-regulating) normal force of the drive wheels pressing down against the document being ejected. In the absence of any driving force on the drive wheels 30 their normal force against the platen glass, or any document thereover, is due only to the relatively light weight of the drive wheels 30, and their axle and the lever arms 36. However, when the drive wheels 30 are driven through the motor 32 and drive belt 34, then any reaction force on the wheels 30 due to resistance of the document to being driven by the drive wheels creates a force vector extending along the plane of the platen 13 in the direction of, but below, the axis 42. Thus, the lever arms 36 transmit a downward vector component of this reaction force to the drive wheels 30. This means that the normal bearing force or pressure of the drive wheels 30 against any document on the platen 13 is automatically increased in proportion to the resistance of the document to being driven off the platen by the drive wheels 30, to a degree determined by the height of the axis 42 above the platen. The application of this known sheet feeding structure here provides an important advantage in that friction of the document against the platen glass tends to cause scratches in the platen glass if high normal driving forces are utilized. By utilizing this driving structure together with the reduction in the resistance of the document to being ejected (by the platen cover spacing arrangement subsequently disclosed herein), the pressure of the drive wheels 30 against the platen may be kept very low for minimal friction between the document and the platen. Reduction of the pressure exerted on the document is also important for preventing distortion or tearing of the document. The drive wheels 30 are preferably made of a resilient and high surface friction material such as a silicone elastomer.

It will also be noted that the positioning of both of the drive wheels 30 adjacent the edge 16 of the platen from which the document is being ejected provides an important advantage. In the entire document ejecting operation the document is under tension rather than compression forces. Thus, the document is not subjected to potential buckling or wrinkling forces which could cause misfeeding and damage to the document. The two drive wheels 30 are the only driving forces acting on the document at any time. No other belts or wheels are required and the document contacting lower surface 40 of the platen cover 12 is stationary, smooth, planar and uninterrupted (except only for the small apertures for the drive wheels 30) over the entire platen 13. Only the lower portion of the drive wheels 30 partially extend through the apertures in the platen cover imaging surface 40.

Considering now the mounting of the platen cover 12 to the copying apparatus 10, it may be seen that this is a conventional hinge mounting along the rear edge of the platen cover 12 in the same mounting position as the original platen cover of the Xerox 4000 copier. There is additionally provided a spring arrangement for the automatic cantilever lifting of the platen cover away from the platen whenever the platen cover is unlatched. Any conventional arrangement therefor may be provided, such as that described in U.S. Pat. No. 3,642,371, previously cited. A spring 44 is schematically illustrated in FIG. 3 by way of example. This platen cover lifting spring has sufficient spring force to lift and hold the platen cover substantially away from the platen automatically when the platen cover is unlatched from the copying position overlying the platen 13. This raised position is illustrated in FIG. 1. In this position, documents may be readily manually placed on the platen without any manual handling of the platen.

The above-noted U.S. Pat. No. 3,642,371, and other platen covers are known wherein a hook or other mechanical latch is provided to hold down an upwardly sprung platen cover, where the platen cover may be unlatched either manually or automatically electrically. However, such previous hold-downs have disadvantages in copiers. The operator has to know where the latch release handle is located and then manually operate it each time it is desired to let the platen lift. That is, such a spring loaded platen cover can not be lifted manually from the platen unless the operator finds and operates the appropriate latch release button or lever. An attempt to force the platen cover open with these latch devices could cause damage to the latch or to the platen cover.

In contrast, the present invention provides a very simple yet effective magnetic latch with sufficient latching force to hold down the self-lifting platen cover against the lifting force of the platen cover lifting spring 44, thereby retaining the platen cover down over the platen 13 for the copying of documents. Yet this disclosed magnetic latch can be manually unlatched merely by slight manual lifting of the platen cover at any time. Thus, no operator instruction is required. Since there is no separate lever or button to be operated, there is no possibility of damage to the cover by manually lifting it, since that is all that is required to unlatch the cover. An automatic electric unlatching system is also provided for unlatching the magnetic latch. However, the magnetic latch does not need any electrical power to be manually opened. Therefore, a document cannot be trapped by machine shut downs or power interruptions. Further, there are no hooks or other projections which an operator could accidentally encounter.

Referring now particularly to FIGS. 1 and 3-5, it may be seen that the exemplary magnetic latch illustrated here comprises two strips 46 and 47 of conventional permanent magnet material extending along the outer most edge of the platen cover 12 and extending slightly below the platen cover lower surface 40. These magnets 46 and 47 overlay and contact a strip 48 of magnetically attractable material fastened to the copying apparatus 10 just off the front edge of the platen. When the cover is closed, the magnets 46 and 47 engage and magnetically latch to the strip 48. Since this magnetic latch is located on the front edge of the platen cover 12, furthest from the hinge side of the platen cover 12, the magnetic latch has the maximum leverage possible for acting against, and overcoming the cover spring 44. However, once the cover is slightly manually lifted so that the magnets 46 and 47 separate from the metal strip 48 even slightly, then the platen cover lifting spring 44 provides the predominant force and the platen cover lifts upwardly from that position automatically. It will be appreciated that the number and relative positions of the magnetic latch components may be varied substantially from those described above.

The automatic electrical unlatching system will now be discussed, as particularly seen in FIGS. 3 and 4. A cam 50 is centrally rotatably mounted on an axis 52 to the front edge of the platen cover 12, between the magnets 46 and 47. This cam 50 can be forceably rotated about its axis 52 by being pulled by a heavy wire 54 from an electrical solenoid 56, connected through a pivoting right angle lever arm 58. The wire 54 connects to the cam 50 intermediately of the axis 52 and the operating extremity or tip 55 of the cam 50 which engages the strip 48. Cam 50 is preferably constructed of nylon or other suitable low friction material so that its tip 55 can slideably rotate and push against the strip 48. As the cam 50 is pulled inwardly by the wire 54 and rotates about its axis 52, its radius at the tip 55 increases slightly so as to force the platen cover 12 with the magnets 46 and 47 slightly away from the strip 48, thereby breaking the magnetic latch connection. The above-described arrangement provides a high leverage and low friction drive so that a relatively low force from the solenoid 56 is required to automatically open the magnetic latch. Also, a relatively short and low inertia movement of this mechanism provides rapid unlatching. It may also be seen that both the magnetic latch and this automatic unlatching structure are virtually jam proof, with no mechanical interlocking. Failure of the automatic unlatching system will not prevent the platen cover from being lifted manually.

It will be appreciated that other suitable automatic unlatching structures may be provided, such as a short stroke solenoid plunger operating directly from the copying apparatus against the platen cover to push the platen cover away slightly. However, the present structure has the advantage that the entire unlatching mechanism may be mounted in the platen cover for easy accessibility, service and installation. The disclosed structure accomplishes this without significantly increasing the moment of inertia or moving mass of the platen cover. This is because the only component of the unlatching system of any significant mass is the solenoid 56, and this is located at the rear of the platen cover adjacent the hinge axis. This mounting is enabled by the remote actuation of the cam 50 through the elongated wire 54.

A second function is provided by the contact between the magnets 46 and 47 and the strip 48. This contact is utilized to provide a fixed mechanical spacer between the platen cover and the copying apparatus 10, which is outside of or off of the platen 13. An important feature in assisting the document removal from the platen by the drive wheels 30 is the provision of a space between the lower surface 40 of the platen cover and the surface of the platen 13. Conventionally, a platen cover presses a document down directly onto the platen cover, and this contact determines the closed position of the platen cover. However, it has been noted that if this lower surface 40 is maintained sufficiently uniformly closely spaced above the platen 13, then in-focus and acceptable copies can be made of documents even if the documents are wrinkled or curled so as not to lie flat directly against the platen 13. Referring to FIG. 2, the disclosed exemplary document imaging means 60 includes an imaging lens for viewing the document through the platen and focusing it onto the photoreceptor or other copying surface. It has a pre-set optical depth of field which extends slightly above the platen. Thus, by maintaining the platen lower surface 40 constantly slightly spaced above the platen 13, but within this depth of field, and where the platen cover extends over substantially all of the platen 13, then all of the document can be held in focus for copying over the entire platen 13. Since this space is greater than the thickness of a normal document, the document is not frictionally held between the platen cover and the platen. Thus, there is no significant frictional resistance to ejecting the document from the platen even while the platen cover is latched down. Accordingly, very little driving force or normal force is required for document ejection by the drive wheel 30 in the present system.

Where such a fixed spacing is utilized the spacing may be initially set by having a lower fully adjustable portion 64 of the platen cover 12 support the platen lower surface 40 adjustably with respect to the rest of the platen cover. This can be provided by a conventional bolt and slot arrangement allowing the platen lower surface 40 to be adjusted in height above the platen 13 while the platen cover is latched down. This spacing may be set by placing over the platen 13 a suitable test sheet or shim plate which pushes the platen lower surface 40 up to the desired spacing, and then locking this lower surface 40 in that position. Thus, for the desired spacing of approximately 0.04 inches between the surface 40 and the platen, a sheet of material of this thickness may be placed over the platen 13 at any time it is desired to check or adjust this clearance.

It will be appreciated that any other suitable fixed spacing means may be utilized to maintain the spacing when the platen cover closes. For example, a separate spacer nib may be utilized if it is desired to resiliently mount the magnets rather than use them for spacing.

Considering now FIGS. 6 and 7, there is disclosed there an alterntive embodiment with a structure for automatically temporarily shifting the platen cover lower surface 40 slightly away from the platen during the actuation of the sheet drive wheels 30, but without releasing the magnetic latch holding down the platen cover. With this arrangement, as shown in FIG. 6, during copying of the document the platen lower surface 40 is pressed directly against the document to press it directly against the platen 13. Since the axis of the drive wheels 30 is pivotal with the pivotal lever arms 36, the drive wheels 30 are fully retractable flush with the surface 40 when that surface is abuting the platen during copying. When it is time to eject the sheet, an additional mechanism is provided in this embodiment to lift the lower surface 40 of the platen cover away from the document on the platen, but without affecting the position of the drive wheels 30, so as to allow the document to be freely ejected as previously described. In this case, of course, the maximum spacing of the surface 40 above the platen is not limited to the optical depth of field and may be substantially greater than 0.04 inches.

The additional mechanism for lifting the lower surface 40 of the platen cover in the embodiment of FIGS. 5 and 6 here comprises an additional solenoid 62 operatively connected to lift the adjustable portion 64 of the platen cover. The lower surface of the adjustable portion 64 is the same platen cover lower surface 40. However, this adjustable portion 64 is slidably mounted to the rest of the platen cover in slots 66 which upwardly inclined in the direction of document sheet feeding. Thus, when the solenoid 62 is actuated the lower surface 40 moves upwardly, and also outwardly in the direction of document ejection. This outward movement transverse the platen 13 provides additional assistance in initiating the movement of the document. These movements are illustrated by the positions and arrows in FIG. 7 in contrast to FIG. 6. The operation of the solenoid 62 may be provided simultaneously with or slightly after the actuation of the motor 32 for the drive wheels 30, and from the same logic circuit, continuing for the same time period as the wheels 30 are driven. It may be seen that this structure provides even more positive document feeding from the platen and allows any desired thickness of material to be copied fully flattened against the platen 13, yet allows the same simple and effective document ejecting drive system to be utilized, with low friction and minimal platen contact during document feeding.

In both embodiments described herein there is no significant movement between the lower or imaging surface 40 of the platen cover and the platen 13 at any time when there is any relative pressure therebetween. In many prior art automatic document feeders a large area moving belt or belts provides the platen lower surface, i.e., provides the white imaging background and moves over the platen while held against it to move the document. The present lower surface 40 does not move against the platen. This is an important advantage since it eliminates serious problems of both wear and contamination of both the surface 40 and the platen 13 surface caused by such relative movement.

Considering now the automatic operation of the disclosed apparatus this is provided by an electrical logic and timing circuit which operatively connects with the conventional, existing, machine logic. An exemplary logic and timing circuit 68 is shown in FIG. 8, and schematically illustrated in FIGS. 3 and 4. The machine logic from the copying apparatus 10 provides the circuit 68 with input signals indicative of the machine copying condition, specifically, the end of copying condition signal utilized here is the "ready light" signal from the machine, and another signal from the copying machine logic is from the "run relay".

A required input to the logic circuit 68 is provided by the actuation of the start print switch 24 previously described on the platen cover 12 itself. The logic circuit 68 is not actuated by the existing conventional start print button on the console of the copying apparatus 10, shown in FIG. 2. While both start print switches will initiate copying through the same existing copying apparatus circuits, only the start print button 24 will additionally initiate the automatic document ejecting and platen cover lifting functions, which are controlled by the circuit 68. The two outputs of the circuit 68 connect, respectively, with the motor 32 for driving the document drive wheels 30 and with the solenoid 56 for operating the automatic platen cover unlatching cam 50.

Manual operation of the start print switch 24 on the platen cover initiates copying of the document on the platen for the number of times pre-selected by the conventional copy count dial on the copying apparatus 10. The switch 24 also simultaneously initiates, through the logic and timing circuit 68, the subsequent in time automatic actuation of the document ejection drive wheels 30, and then the automatic unlatching solenoid 56, in that order. Thus, any document on the platen 13 is automatically ejected and the platen cover is then automatically lifted; all under the control of the logic circuit 68 without any manual intervention by the operator being required. (However, the platen cover can be lifted manually at any time without damage to it or the document.)

Referring to the exemplary logic and timing circuit 68 as illustrated in FIG. 8, it may be seen that there are three circuit inputs. The first is the closing signal from the start print switch 24 on the platen cover. The second is a run relay signal from the copying apparatus 10 indicative that the machine is running. The third is an operating signal from the existing ready lamp circuit on the copying apparatus 10, indicative of the copier being in a ready condition to begin document copying. These inputs are connected through a time delay circuit 70 to a four state register 72 through a lead 74. The four state register 74 is a conventional dual type D flip-flop. It shifts its register states from D to Q upon a clock signal input at C.

All of the circuit elements and components illustrated in FIG. 8 are conventional and commercially available digital logic circuit components. Conventional digital logic schematic representation is utilized in this figure. A bubble or small circle at the lead connection to a circuit component indicates a "low" logic level, and the absence of a bubble indicates a "high" logic level.

It will be appreciated that the circuitry illustrated herein is exemplary, and that various other logic circuit configurations may be utilized to achieve the same logic functions. While the two outputs illustrated here are to the motor 32 and to the solenoid 56, for the embodiment of FIGS. 6 and 7 an additional output can be provided to the solenoid 62. These outputs are through conventional SCR output or drive circuits, powered by a conventional DC power supply 76.

Describing, in sequence, the logic and timing operation of the circuit 68, in the initial or standby condition there is no output to the motor 32 or solenoid 56 and the register 72 in its first state. In the second state of the counter 72 the circuit 68 has been activated by activation of the start print switch 24, but there is still no output. Upon the receipt of the other two inputs from the run relay and ready lamp from the copier, the register 72 then reaches its third state, in which the motor 32 (operating the drive wheels 30) is activated, but the solenoid 56 remains shut off (so that the platen cover remains latched down during the document ejecting run). This third state of the register 72 also initiates the running of the time delay circuit 70 for an approximately 0.3 to 0.5 seconds time delay which it provides. This pre-set time delay determines the operating time of the motor 32. This operating time is determined as a function of the motor speed and the diameter of the drive wheels 30 so that the drive wheels can eject a document which is the full width of the platen cover, and then shut off so that the wheels 30 do not run for any significant time period against the bare platen after the document is ejected. The output signal provided at the end of this time delay also places the register 72 in its fourth and last state. This fourth state switches the motor 32 off and switches on the solenoid 56 to start the lifting of the platen cover. Then, after an approximately 0.1 second time delay, to allow for the platen cover to be lifted, the solenoid 56 is shut off and the register 72 is reinitialized to place it in condition to begin another copying cycle.

The document handling system disclosed herein is presently considered to be preferred; however, it is contemplated that further variations and modifications within the purview of those skilled in the art can be made herein. The following claims are intended to cover all such variations and modifications as fall within the true spirit and scope of the invention.

What is claimed is:

1. In a copying apparatus with a generally horizontal document copying platen, said platen extending to one edge of said copying apparatus to provide for book copying on said platen with a portion of the book extending beyond said edge, and further including a platen overlayable platen cover for holding document sheets on said platen for copying, the improvement comprising:

upper and lower document trays, both mounted to said apparatus extending beyond said same edge from closely adjacent said platen, said upper document tray normally overlying said lower document tray and being adapted to hold a stack of documents therein for movement of said documents from said upper document tray onto said platen, said upper document tray being pivotable away from said platen and said lower document tray to provide unobstructed book copying on said platen with a portion of the book extending beyond said edge, said lower document tray being spaced below said upper document tray and below said platen and positioned and formed to receive therein documents removed from said platen, and said lower document tray having a supporting surface extending downwardly sloping away from said platen at said edge for supporting the otherwise unsupported portion extending beyond said edge of a book being copied on said platen.

2. The copying apparatus of claim 1, wherein said upper document tray pivots vertically upward at right angles to said platen about a hinge line at the rear thereof.

3. The copying apparatus of claim 1, wherein said upper document tray is pivotally mounted to said lower document tray along one edge thereof.

* * * * *